US008509537B2

(12) United States Patent
Perronnin et al.

(10) Patent No.: US 8,509,537 B2
(45) Date of Patent: Aug. 13, 2013

(54) LEARNING WEIGHTS OF FONTS FOR TYPED SAMPLES IN HANDWRITTEN KEYWORD SPOTTING

(75) Inventors: Florent C. Perronnin, Domène (FR); Thierry Lehoux, Grenoble (FR); Francois Ragnet, Venon (FR)

(73) Assignee: Xerox Corporation, Norwalk, CT (US)

( * ) Notice: Subject to any disclaimer, the term of this patent is extended or adjusted under 35 U.S.C. 154(b) by 469 days.

(21) Appl. No.: 12/851,092

(22) Filed: Aug. 5, 2010

(65) Prior Publication Data
US 2012/0033874 A1 Feb. 9, 2012

(51) Int. Cl.
G06K 9/18 (2006.01)
G06K 9/62 (2006.01)
G06K 9/72 (2006.01)

(52) U.S. Cl.
USPC ............ 382/186; 382/229; 382/156; 382/159

(58) Field of Classification Search
None
See application file for complete search history.

(56) References Cited

U.S. PATENT DOCUMENTS

| | | | |
|---|---|---|---|
| 5,438,630 A | 8/1995 | Chen et al. | |
| 5,825,919 A | 10/1998 | Bloomberg | |
| 5,841,902 A | 11/1998 | Tu | |
| 8,335,381 B2 * | 12/2012 | Serrano et al. | 382/186 |
| 2003/0101187 A1 | 5/2003 | Gaussier et al. | |
| 2007/0005356 A1 | 1/2007 | Perronnin | |
| 2007/0258648 A1 | 11/2007 | Perronnin | |
| 2008/0069456 A1 * | 3/2008 | Perronnin | 382/228 |
| 2009/0060335 A1 | 3/2009 | Serrano et al. | |
| 2009/0060396 A1 | 3/2009 | Bressan et al. | |
| 2009/0180695 A1 | 7/2009 | Serrano et al. | |
| 2009/0252417 A1 | 10/2009 | Perronnin et al. | |
| 2010/0008581 A1 | 1/2010 | Bressan | |
| 2010/0067793 A1 | 3/2010 | Serrano et al. | |

OTHER PUBLICATIONS

Florent Perronnin and Jose A. Rodriguez-Serrano. "Fisher kernels for handwritten word-spotting," in 10th International Conference on Document Analysis and Recognition (ICDAR), Barcelona, Jul. 26-29, 2009.
Agarwal, et al. "Hyperfeatures—Multilevel Local Coding for Visual Recognition", ECCV06, 2006.
Csurka, et al. "Visual Categorization With Bags-Of-Keypoints", Proc. ECCV International Workshop on Statistical Learning in Computer Vision, 2004.
Reynolds, et al. "Speaker verification using adapted Gaussian mixture models". *Digital Signal Processing*, 10:19, 41 (2000).
U.S. Appl. No. 12/361,178, Serrano, et al.

(Continued)

Primary Examiner — Matthew Bella
Assistant Examiner — Thomas Conway
(74) Attorney, Agent, or Firm — Fay Sharpe LLP

(57) ABSTRACT

A wordspotting system and method are disclosed. The method includes receiving a keyword and, for each of a set of typographical fonts, synthesizing a word image based on the keyword. A keyword model is trained based on the synthesized word images and the respective weights for each of the set of typographical fonts. Using the trained keyword model, handwritten word images of a collection of handwritten word images which match the keyword are identified. The weights allow a large set of fonts to be considered, with the weights indicating the relative relevance of each font for modeling a set of handwritten word images.

28 Claims, 6 Drawing Sheets

(56) References Cited

OTHER PUBLICATIONS

U.S. Appl. No. 12/567,920, Ragnet, et al.
The First 100 Most Commonly Used English Words, www.duboislc.org/EducationWatch/First100Words.html (accessed Jun. 23, 2010).
J. A. Bilmes, "A gentle tutorial of the EM algorithm and its application to parameter estimation for Gaussian mixture and hidden Markov models," UC Berkeley, TR-97-021, 1998.
Gauvain, et al. "Maximum a Posteriori Estimation for Multivariate Gaussian Mixture Observations of Markov Chains," *IEEE Trans. on Speech and Audio Processing,* 2(2):291-298, Apr. 1994.

\* cited by examiner

| FONT TYPE | FONT WEIGHT ($\omega_i$) |
|---|---|
| *Kunstler Script* | 0.122 |
| *French Script* | 0.110 |
| *Lucinda Handwriting* | 0.098 |
| *Harlow Solid Italic* | 0.075 |
| *Bradley Hand ITC* | 0.071 |
| Comic Sans MS | 0.062 |
| *Gigi* | 0.057 |
| Papyrus | 0.054 |
| ...... | |
| Verdana | 0.013 |
| Arial | 0.012 |
| ... | |
| ... | |
| Courier New | 0.003 |
| .. | |

FIG. 5

LEARNING WEIGHTS OF FONTS FOR TYPED SAMPLES IN HANDWRITTEN KEYWORD SPOTTING

BACKGROUND

The exemplary embodiment relates generally to recognition of handwritten words in document images without having to detect or identify the individual characters making up the words or the full text. It relates particularly to a system and method for weighting fonts for training a probabilistic model using samples of synthesized training word images, and finds application in document classification, processing, analysis, sorting, detection, handwritten word spotting, and related arts.

Text of electronically encoded documents tends to be found in either of two distinct formats, namely bitmap format and character code format. In the former, the text is defined in terms of an array of pixels corresponding to the visual appearance of the page. A binary image is one in which a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where it is desirable for text to be extracted from a document or a portion thereof which is in bitmap format. For example, a document may be available only in a printed version. In the case of a mailroom, for example, documents, such as letters, often arrive in unstructured format, and for ease of processing, are classified into a number of pre-defined categories. Manual classification is a time consuming process, often requiring a reviewer to read a sufficient portion of the document to form a conclusion as to how it should be categorized. Methods have been developed for automating this process. In the case of typed text, for example, the standard solution includes performing optical character recognition (OCR) on each letter and extracting a representation of the document, e.g., as a bag-of-words (BoW) in which a histogram of word frequencies is generated. Classification of the letter can then be performed, based on the BoW histogram.

However, a significant portion of the letter flow in a mailroom is typically handwritten. To handle handwritten text, one solution is to replace the OCR engine with a Handwriting Recognition (HWR) engine. However, this approach has at least two significant shortcomings: (i) the error rate of HWR engines is much higher than that of OCR engines and (ii) the processing time, i.e., the time it takes to obtain the full transcription of a page, is also very high (several seconds per page). When large numbers of documents are to be processed, as in the case of a mailroom, this is not a viable alternative for the handwritten letters.

"Word-spotting" methods have been developed to address the challenge of classifying handwritten documents. Such methods operate by detecting a specific keyword in a handwritten document without the need of performing a full transcription. For example, an organization dealing with contracts may wish to identify documents which include keywords such as "termination" or "cancellation" so that such documents can receive prompt attention. Other organizations may wish to characterize documents according to their subject matter for processing by different groups within the organization.

In current word spotting methods, handwritten samples of the keyword are extracted manually from sample documents and used to train a model which is then able to identify the keyword, with relatively good accuracy, when it appears in the document text. One system, based on hidden Markov models (HMMs), represents words as a concatenation of single-state character HMMs. This system employs segmentation of the characters prior to feature extraction. Another system uses multiple-state HMMs to model characters without requiring segmentation of words into characters.

Manual selection of handwritten samples can be time consuming. Accordingly, it has been proposed to learn statistical models to spot keywords in handwritten documents using, as training samples, word images synthesized automatically from computer fonts. However, there are many computer fonts available and selection of an appropriate set of fonts on which to train a keyword model may be time consuming. For example, assume that there is a pre-defined list of K keywords and that a handwritten corpus is labeled with respect to these keywords so that it is possible to measure the retrieval accuracy (e.g., in terms of precision and recall) with respect to the K keywords. Assume that a set of F fonts is available from which the best set of fonts is to be identified, based on accuracy. The font selection may involve testing the accuracy with models trained on different combinations of fonts. For example, models may be trained which combine the n best fonts (the fonts which, if used individually, score the highest), where n=1, 2, 3 . . . F. The retrieval accuracy is then determined for each model and for each keyword. An average score may be computed over all the keywords. The combination of fonts which produces the highest average of the retrieval accuracies is then selected. Such a heuristic is computationally intensive. For example, if K=10 keywords and F=25 fonts and a fairly small corpus of approximately 500 pages is used, it may take on the order of a day to select the optimal combination of fonts (on a single CPU of a 2.8 GHz AMD Opteron™ machine). Additionally, this method requires the hand-labeling of the corpus (or at least a subset of it) according to the set of K pre-defined keywords. This adds to the time consuming nature if the process.

Further, the fonts selected by this method may be influenced by the chosen keywords. Thus, if a user wishes to search for different keywords, the method may need to be repeated with the new keywords. While the number of keywords K could be increased, this would increase the computational cost and the amount of hand labeling required.

Additionally, the appropriate set of fonts may vary, depending on the type of handwritten documents on which the trained system is to be applied. For example, writing styles vary between countries and may also vary according to the age group of the writer, their occupation (e.g., doctor vs. school teacher), etc.

The exemplary embodiment provides a method for selection of weights for a set of computer fonts which overcomes the above-mentioned problems, and others.

INCORPORATION BY REFERENCE

The following references, the disclosures of which are incorporated herein in their entireties by reference, are mentioned:

The following relate generally to word spotting methods: U.S. Pub. No. 2009/0060396, published Mar. 5, 2009, entitled FEATURES GENERATION AND SPOTTING METHODS AND SYSTEMS USING SAME, by Bressan, et al.; U.S. Pub. No. 2009/0060335, published Mar. 5, 2009, entitled SYSTEM AND METHOD FOR CHARACTERIZING HANDWRITTEN OR TYPED WORDS IN A DOCUMENT, by Serrano, et al.; U.S. Pub. No. 2009/0180695, published Jul. 16, 2009, entitled ASYMMETRIC SCORE NORMALIZATION FOR HANDWRITTEN WORD SPOTTING SYSTEM, by Serrano, et al.; U.S. Pub. No. 2009/0252417, published Oct. 8, 2009, entitled UNSUPERVISED WRITER STYLE ADAPTATION FOR HANDWRITTEN WORD SPOTTING, by Perronnin, et al.; U.S. Pub. No. 2010/0008581, published Jan. 14, 2010, entitled WORD DETECTION METHOD AND SYSTEM, by Marco J. Bressan; U.S. Pub. No. 2010/0067793, published Mar. 18, 2010, entitled HANDWRITTEN WORD SPOTTER USING SYNTHESIZED TYPED QUERIES, by Serrano, et al.; U.S. application Ser. No. 12/361,178, filed Jan. 28, 2009, entitled MODEL-BASED COMPARATIVE MEASURE FOR VECTOR SEQUENCES AND WORD SPOTTING USING SAME, by Serrano, et al.; U.S. patent application Ser. No. 12/567,920, filed Sep. 28, 2009, entitled HANDWRITTEN DOCUMENT CATEGORIZER AND METHOD OF TRAINING, by Francois Ragnet, et al.; and "Fisher kernels for handwritten word-spotting," by Florent Perronnin, et al. in 10th International Conference on Document Analysis and Recognition (ICDAR), Barcelona, Jul. 26-29, 2009.

U.S. Pat. No. 5,841,902 to Tu discloses a character recognition system which includes a character input device, such as a stylus and tablet or optical scanner, for receiving inputted characters, and a processor. The processor determines which of a number of model characters best matches the inputted character. The processor extracts a feature value vector from the inputted character and compares it to the mean feature value vector of each class of characters. The processor recognizes the inputted character as the model character corresponding to the mean feature value vector which is closest to the feature value vector of the inputted character. The processor also constructs a database from multiple specimens of each model character. The processor organizes the specimens of each model character into multiple classes. The processor then determines the mean feature value vector of each class.

U.S. Pat. No. 5,438,630 to Chen, et al. and U.S. Pat. No. 5,825,919 to Bloomberg, et al. are both directed to methods for word identification which are based on features of the entire word, without the need for segmentation or OCR, and without the need to recognize non-keywords. In the method of Chen, font-independent character models are created using Hidden Markov Models (HMMs) and arbitrary keyword models are built from the character HMM components. Word or text line bounding boxes are extracted from the image. A set of features based on the word shape (and optionally also the word internal structure) within each bounding box is extracted. This set of features is applied to a network that includes one or more keyword HMMs.

BRIEF DESCRIPTION

In accordance with one aspect of the exemplary embodiment, a method includes receiving a keyword and, for each of a set of typographical fonts, a word image is synthesized, based on the keyword. A keyword model is trained, based on the synthesized word images and respective font weights. Using the trained keyword model, handwritten word images of a collection of handwritten word images which match the keyword are identified. One or more of the parts of the method may be performed with a computer processor.

In another aspect, a computer implemented processing system includes a synthesizer which synthesizes a word image in each of a set of fonts based on a received keyword, a keyword model, stored in memory, which is trained on descriptors extracted from the synthesized word images and the generated font weights, a scoring component which scores handwritten word images of a collection of handwritten word images against the keyword model and, based on the scores, identifies any matching handwritten word image or images. A computer processor may implement one or more of the font weight generator, synthesizer, and scoring component.

In another aspect, a computer implemented method for wordspotting includes receiving a keyword to be searched for in a collection of handwritten word images extracted from one or more documents. For each of a set of fonts, a synthesized word image is automatically generated based on the keyword. The keyword is modeled with a semi-continuous hidden Markov model which takes into account weights assigned to each of the fonts, the weights being learned by maximizing a similarity between a weighted distribution of descriptors of synthesized training word images and a distribution of descriptors of handwritten training word images, each descriptor being based on features extracted from a respective synthesized or handwritten training word image. With the model, matching word images in the collection of handwritten word images are identified. A record of the matching word images is output.

BRIEF DESCRIPTION OF THE DRAWINGS

FIG. 5 illustrates an exemplary list of font weights for a set of fonts; and

DETAILED DESCRIPTION

Figure 1:
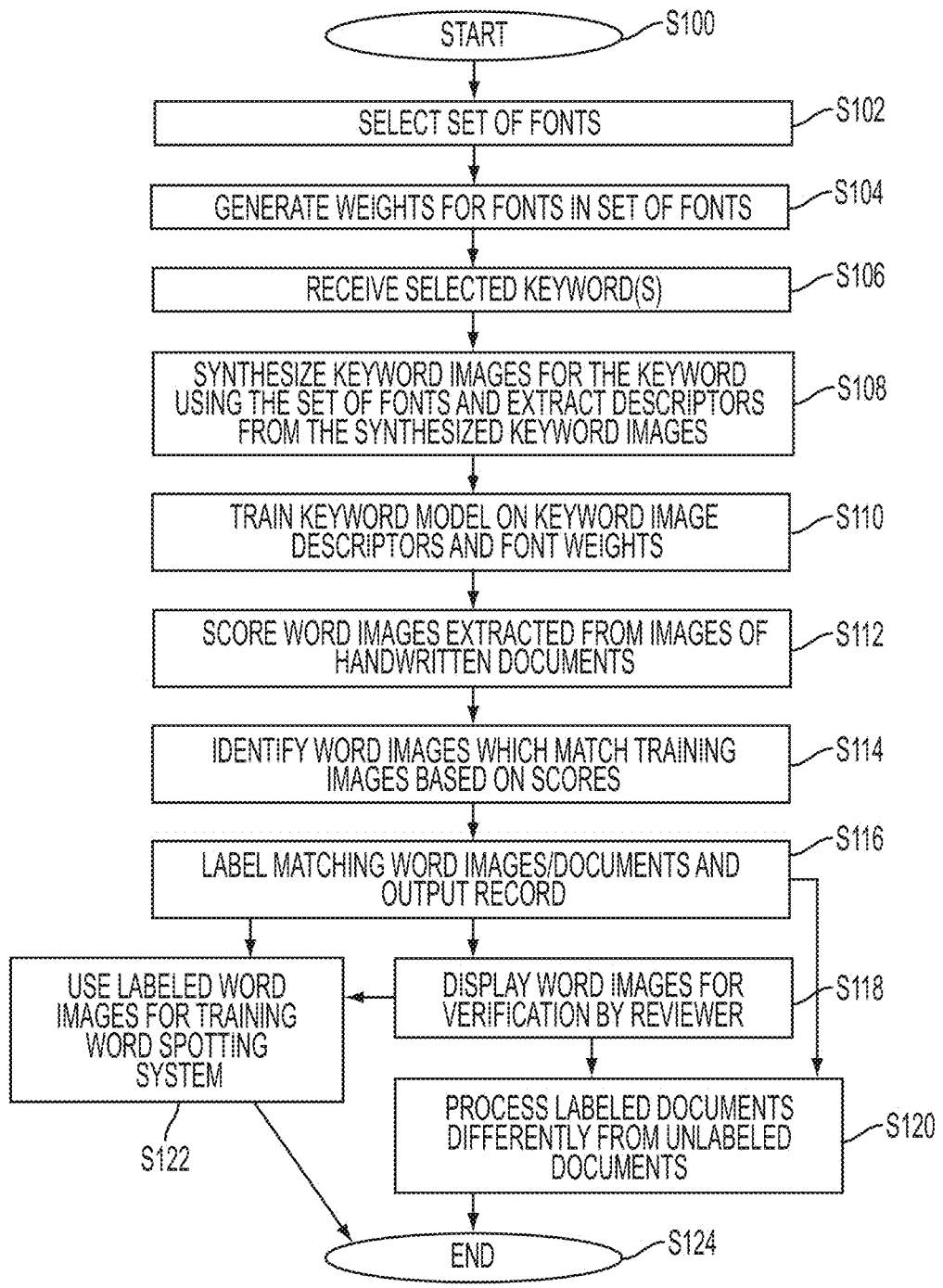
FIG. 1 is a flow diagram which illustrates an exemplary method for training a keyword model using weights for a set of typographic fonts and for using the trained keyword model to identify handwritten word images which match an input keyword in document images.

Aspects of the exemplary embodiment relate to a system and method for assigning weights to a set of typographic fonts which can then be used in a wordspotting method such as those described in copending application 2010/0067793. In the exemplary method, rather than selecting a set of the best fonts, the exemplary method learns a weight for each of a set of fonts. Each weight indicates whether the corresponding font is representative of a handwritten corpus under consideration. In the exemplary embodiment, these weights are learned by maximizing the similarity between a weighted distribution of word images synthesized using a given font, as represented by features extracted from each word image, and a distribution of handwritten word images, as represented by their corresponding features. These weights can then be used to weight feature-based descriptors of training word images generated in the different fonts when learning a particular keyword model.

Each of the synthesized fonts includes a set of characters (letters, numbers, punctuation, etc.) in a predetermined style. Each character in the synthesized font may be stored in computer memory as an arrangement of pixels (for a given font size). The weights assigned to the synthesized fonts in the set of fonts emphasize the relative effectiveness of each font in simulating handwritten words in documents and thus the font's relative usefulness in generating a model for use by a categorizer to spot a selected keyword in handwritten documents based on a set of word images of the keyword generated using the synthesized fonts.

In copending application 2010/0067793, a small subset of available fonts, which are individually found to be effective in simulating handwriting for specific keywords is selected for training keyword models. The present method avoids the need to identify a specific subset of fonts and also allows font weights to be generated independently of the keywords. In the exemplary embodiment, these font weights can be generated prior to the selection of keywords.

As used herein, handwritten documents are those which, in their original form, were prepared by hand, using a writing implement, such as a pen, pencil, or the like. Typical handwritten documents may include letters, filled-in forms, invoices, receipts, combinations and portions thereof, and the like.

Typed documents are those, which in their original form, were prepared using generated type fonts, such as with a computer keyboard, keypad, typewriter, or the like, or which have been automatically generated by a computer, based on stored information. As will be appreciated, both handwritten and typed documents may be scanned or otherwise converted to digital form, e.g., a bitmap, for processing.

In various aspects, a system and method are disclosed for learning font weights which can be used in searching for a keyword in a collection of handwritten document images. The keywords may be selected to allow categorization of the document. A keyword, as used herein, can be any query string which includes a set of characters in a selected order, such as a word, short phrase, numbers, or the like, which is to be searched for and identified, where present, in a document image. The keywords to be identified are generally known words in a particular natural language, such as English or French, but need not be. A keyword can be, for example, a name of a person, company, or product, a word likely to be present in documents of interest, or the like. The types of query strings which can be searched are limited only by the set of the characters which can be used for inputting a typed query string which is to be searched. For example, on an alphanumeric keyboard, the query string may be generated from a character set comprising the 26 letters of the alphabet, in both upper and lower case, the numbers 0-9, and other symbols, such as punctuation as well as symbols, such as $, €, and &. All of the characters in the character set can be automatically generated in a plurality of different fonts.

For example, given a corpus of handwritten documents, one goal of the exemplary method may be to retrieve all the occurrences of a particular keyword. The documents in the corpus are pre-segmented into a set of word images (or word image hypotheses). The method may rank all these word images according to their likelihood of containing the specified keyword.

The exemplary embodiment is discussed in the context of binary images. In this context, the term "image" refers to a representation of a two-dimensional data structure composed of pixels. A binary image is an image where a given pixel is either "ON" (active) or "OFF" (inactive). Pixels are generally defined to be active if they are black and inactive if they are white. It should be noted that the designation of black as ON and white as OFF reflects the fact that most documents of interest have a black foreground and a white background. It is to be appreciated that the exemplary method is not limited to black and white images but is appropriate to images of any suitable color separation or separations. Negative images may be converted to positive images, if desired, prior to processing.

A document image is generally an image of a physical page of a document, although a document image may contain multiple pages or a portion of a page. A document image may be generated by scanning or otherwise capturing an image of a physical document page.

Handwritten word images (or more accurately, "word hypotheses") are generally images of single (or sometimes multiple) words and/or numbers comprising handwritten text, which have been extracted from a document image. Each handwritten word image may comprise a character string comprising a group of characters, such as letters and/or numbers) which are sufficiently closely grouped together to allow the word image to be distinguished from other word images in the document. By "word hypotheses," it is meant that the word images are derived from images of handwritten documents. However, since the process of extracting the images can be fully automatic, it is to be appreciated that it cannot be guaranteed that every extracted image is actually an image of handwritten word, but is none-the-less treated as a handwritten word during processing. The handwritten documents from which the handwritten word images are obtained are often in a cursive script, and are generated manually, using a pen or pencil or other writing implement, i.e., without the use of a mechanical device such as a typewriter, word processor, or computer. It is to be appreciated that some handwritten documents to be searched may include both handwritten words as well as typed words, which can both be queried at the same time.

As used herein, "training word image" denotes a word image which is used in a training phase to generate font weights and can be "handwritten" or "synthesized;" "keyword image" denotes a synthesized word image in a given font of a selected keyword which is being used in the generation of a keyword model; and "candidate handwritten word image" or simply "candidate word image" denotes a handwritten word image which is being tested with the keyword model. It is to be appreciated that the handwritten training word images and candidate word images may be drawn from the same pool of handwritten word images, but need not be. In one embodiment, at least some of the candidate word images are not among the training handwritten word images. The keyword images used in training a keyword model may be among the set of synthesized training word images, but need not be, and in one embodiment, none of the keyword images is among the set of synthesized training word images.

A "descriptor," as used herein, for a given word image (handwritten or synthesized) is based on information extracted from the word image. Each descriptor can be a single histogram or a sequence of histograms, each histogram being generated from low level features extracted from a respective patch of the respective word image. The exemplary histograms may each be, for example, a histogram of oriented gradients (HOG), although other low level features, such as gray levels, are also contemplated. In the exemplary embodiment, a sequence of descriptors is extracted for each word image.

The terms "optimization," "maximization," "minimization," and similar phraseology, as used herein, are to be broadly construed as one of ordinary skill in the art would understand these terms. For example, these terms are not to be construed as being limited to the absolute global optimum value, absolute global minimum, and so forth. For example, maximization of a function may employ an iterative maximization algorithm that terminates at a stopping criterion before an absolute maximum is reached. It is also contemplated for the optimum or maximum value to be a local optimum or local maximum value.

Figure 2:
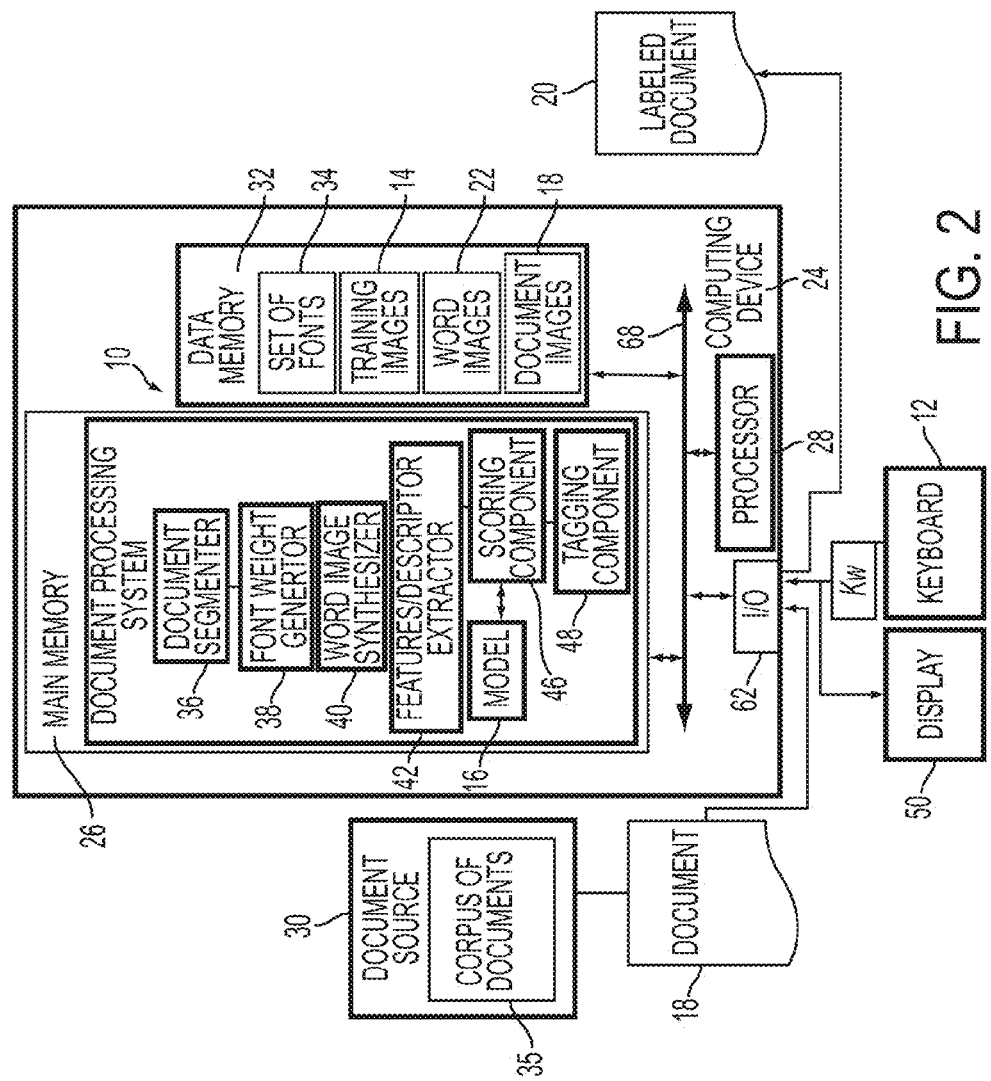
FIG. 2 is a schematic functional block diagram of a computer apparatus which hosts a system for training a keyword model using weights for a set of typographic fonts and for using the trained keyword model to identify handwritten word images which match an input keyword.

FIG. 1 illustrates steps of an exemplary automated method for identifying handwritten text corresponding to a keyword in images of handwritten documents. The method may be implemented with a system 10 as illustrated in FIG. 2, which is described in greater detail below. The method presumes that a collection of candidate handwritten word images have been extracted from one or more documents. A method for extracting these word images is described below. However, it is also contemplated that the word images may be extracted subsequent to input of a user's query, for example, from specific document(s) identified by a user or known to have been written by the same user or a group of users having a similar handwriting style.

The method begins at S100.

At S102, a set of computer-generated fonts is selected.

At S104, a weight for each font in the set of fonts is determined. The weights of the fonts are selected to optimize a similarity between a weighted distribution of descriptors of synthesized training word images and a distribution of descriptors of handwritten training word images. The method of generating the font weights is described in greater detail below with reference to FIG. 3.

Figure 4:
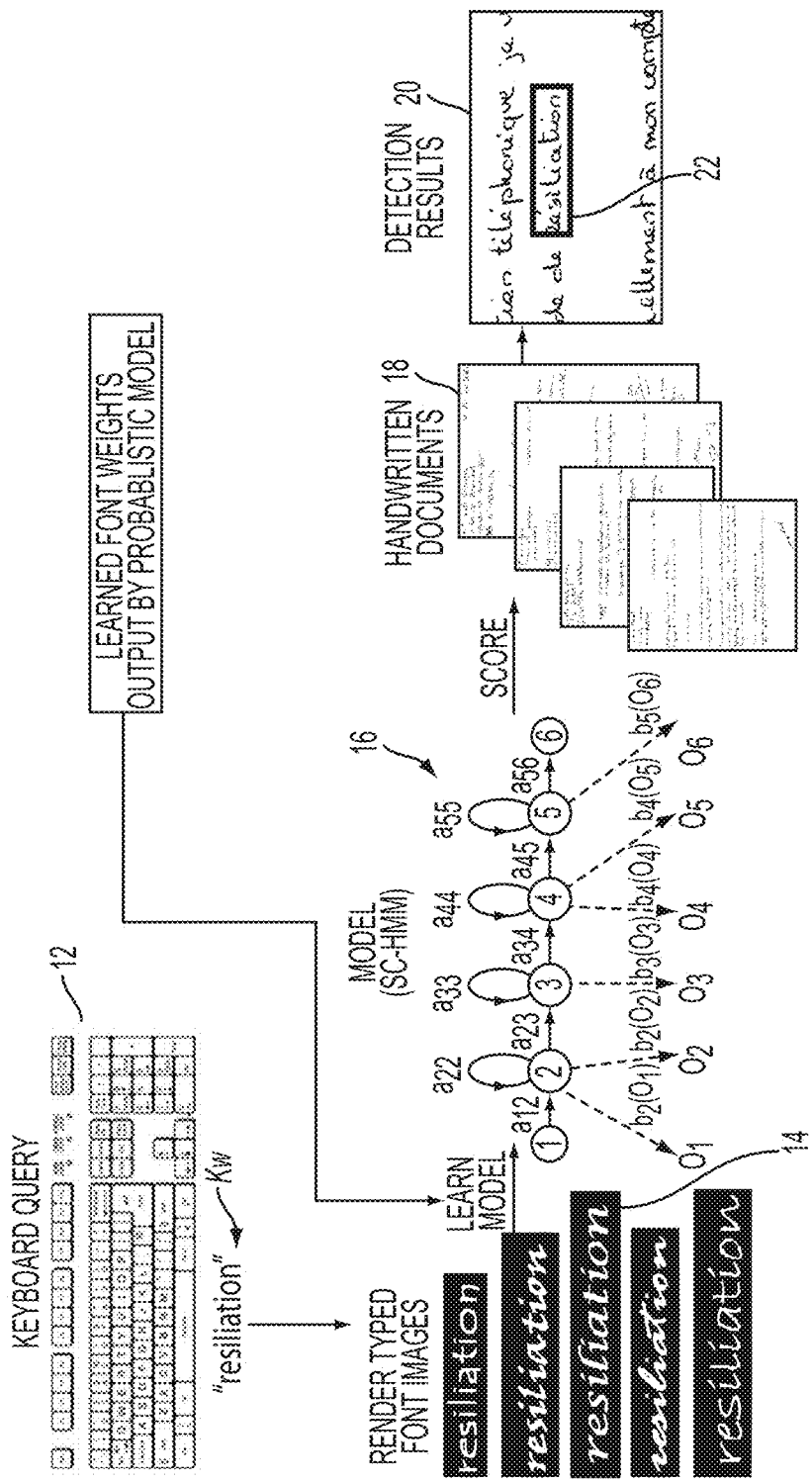
FIG. 4 graphically illustrates steps of the exemplary method of FIG. 1.

At S106, a selected keyword Kw to be searched in a collection of candidate handwritten word images is input, for example, by a user typing the keyword on an input device, such as a keyboard. For example, the user may type the word resiliation (French for cancelation) on a keyboard 12, as illustrated in FIG. 4. Alternatively, the keywords may be generated automatically, e.g., from typed documents which have been manually assigned to classes of interest.

At S108, given a typed or otherwise selected keyword Kw, multiple synthesized keyword images 14 of the keyword are generated by varying only the font. Specifically, a set of computer-generated keyword images 14 for the selected keyword is automatically rendered using different computer typographic fonts. For example, as shown in FIG. 4, the word resiliation (cancellation in French) has been rendered in five different fonts, to provide a set of rendered type font images 14 although fewer or more fonts may be employed. In the exemplary method a large number of fonts may be employed such as at least ten or at least twenty, and in some embodiments up to about 100 or more fonts. In one embodiment, additional examples may be generated which do not replicate the keyword exactly. Such "noisy" keyword samples may include common misspellings or spelling variations of the keyword formed by adding one or more letters, deleting one or more letters, or replacing one or more letters. For example, in addition to rendering the word resiliation in a plurality of different fonts, the word resilliation could be rendered in a plurality of fonts.

At S110, a model 16 is trained on descriptors extracted from of the keyword images 14 generated at S108 and the previously-generated font weights. As for the synthesized training word images generated at S104, the descriptors are each generated by extracting features from patches of a respective keyword image 14. The extracted descriptors are then used to train the model 16. One model can be trained on all keyword image descriptors or a separate model can be trained for each keyword image.

At S112, a collection of candidate handwritten word images 22, which have been extracted from a document or collection of documents, is scored, based on the descriptors of the respective candidate word images 22 and the trained model 16.

Based on the scores, a determination may be made as to whether each candidate word image has a likelihood of corresponding to the input keyword (S114). For example, the candidate word images in the collection are scored using the model and a score-dependent result is returned, such as the top-N ranked candidate word images or candidate word images with a score higher than a fixed threshold. These top scoring candidate word images may be labeled as keyword matches.

At S116, information based on the matching word image(s) (keyword matches) may be output, e.g., to a display or to memory. The information output may comprise any information which identifies the matching word image or document(s) 18 which contain one or more of the matching word images. The information can be, for example, a document and/or word image label, a display of the word image, or the like.

In one embodiment, at S118, labeled documents 20, or relevant portions thereof, may be displayed to a reviewer, with the matching word images 22 highlighted, e.g., as shown in FIG. 4. The person reviewing the word images may reject any document(s) 20 where the highlighted word image 22 does not, in the reviewer's opinion, correspond to the typed query Kw.

Alternatively, or additionally, at S120, a processing operation may be performed in which labeled documents 20 are processed differently from unlabeled documents. For example, labeled documents may be processed as a priority. Or, labeled documents may be indexed in a database according to their keyword labels.

In yet another embodiment, the matching word images 22 are themselves used as training examples to train a wordspotting system of the type described in above-mentioned U.S. Pub Nos. 2009/0060396; 2009/0060335; 2009/0180695; 2010/0008581; and 2010/0067793 (S122), i.e., the method is used to find handwritten training samples which can be used in the generation of a codebook.

The method ends at S124.

In the exemplary embodiment, at S106, the user enters a search for a single word. If a user types more than one word as the keyword in S104, these may be split into two or more keywords and a model 16 trained for each keyword at S106. At S112, only documents which contain samples of each of the selected keywords, optionally further limited by being in close proximity in the document 20, may be tagged. In another embodiment, the user may be asked to select one word of the query to be searched first.

The exemplary method may utilize some or all of the following:

1. Robust word image normalization: word images (handwritten and synthesized) are normalized with respect to skew, slant and text height.

2. Robust feature extraction: a word image (hand written or synthesized) is described by a sequence of feature vectors. A sliding window is shifted from left to right and one feature vector is extracted from each window. For example, 128-dimensional histograms of oriented gradients (HOG) features are used. These have been shown to be more robust than the standard features used in the handwriting literature. A descriptor describing a word image 14, 22 can contain from a few tens to a few hundreds of such HOG vectors.

3. Robust statistical modeling: to enable the exemplary keyword model 16 to be trained on a relatively small number of synthesized word image descriptors, a statistical model which is robust to over-fitting is desirable. In the exemplary embodiment, a semi-continuous Hidden Markov Model (SC-HMM) is used. In a SC-HMM, the emission probabilities are Gaussian mixture models (GMMs) and the same pool of Gaussians is shared across the different states of the different keyword models. This pool of Gaussians is typically learned in an unsupervised fashion from the descriptors extracted from a large set of training handwritten samples.

Figure 3:
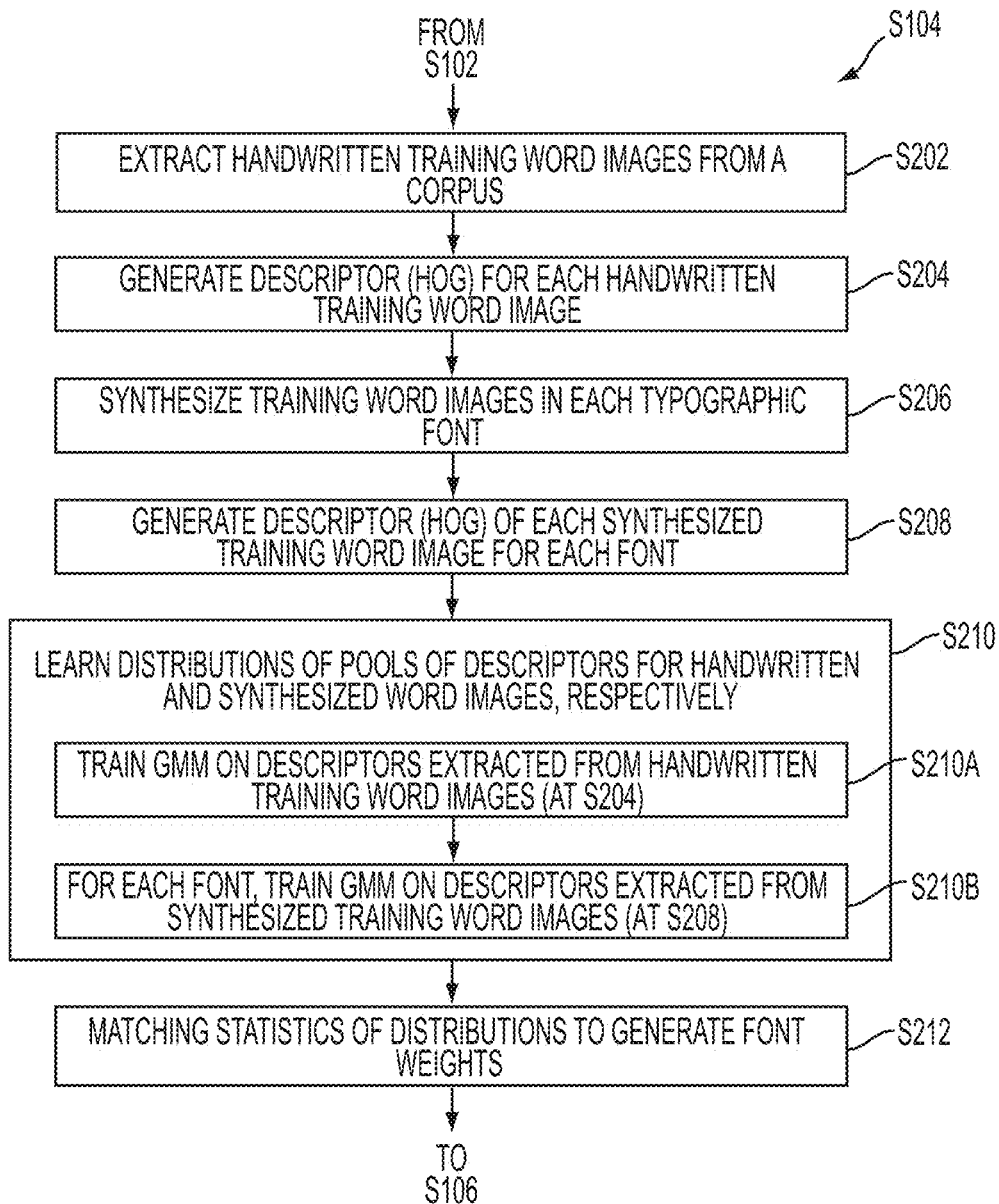
FIG. 3 is a flow diagram which illustrates a method for generating font weights in one embodiment of the method of FIG. 1.

FIG. 2 illustrates an exemplary computer-implemented wordspotting system 10 suitable for performing the exemplary method shown in FIGS. 1 and 3. The exemplary system 10 is resident on one or more computing devices 24 and may be in the form of hardware or a combination of hardware and software. The exemplary system 10 comprises software instructions stored in main memory 26 of the computing device 24 which are executed by an associated processor 28.

One or more documents 18 to be processed by system 10 are received from a suitable source 30 of such documents, such as a scanner, camera, data storage device, or the like. Each document 18 may comprise one or more digital pages, each page comprising one or more images, such as binary images. In one aspect of the exemplary embodiment, the documents 18 to be processed comprise scanned images of physical documents which include text that may be handwritten (e.g., in cursive script), such as correspondence. During processing, document images 18, and handwritten word images 22 extracted therefrom, may be stored in data memory 32, incorporated into or otherwise accessible to the system 10. Data memory 32 may also store a set of computer-generable fonts 34. Alternatively, these fonts may be accessed from an external resource. A corpus 35 of one or more digital documents, similar to and/or including document 18, to be used in learning font weights for the set of fonts 34 may be received from a document source, such as source 30, and may be stored in memory 32, at least during the font weight generation step S104.

The system 10 includes various processing components, which may be embodied in hardware and/or software. These components may include a document segmenter 36, which processes a document image 18 to identify a collection of handwritten word images 22, generally by identifying clusters of active pixels which are surrounded by inactive pixels. The segmenter 36 operates without consideration of the individual characters which form the handwritten word image. A handwritten word image 22 can thus comprise any object which is capable of being identified as a discrete entity by the particular segmentation techniques being used. While in general the extracted word images are entire words, the system may identify partial words or multiple words as word images, if the spacing between the objects is above or below a given threshold.

A font weight generator 38 generates a weight for each font (or at least some of the fonts) in the set of fonts 34 accessible to the system, as described below with reference to FIG. 3. The font weight generator may include a probabilistic model.

A user input device 12, such as a keyboard, keypad, trackball, touch screen, voice recognition input device, or the like, in communication with the system 10, allows a user to input a selected keyword Kw, or a set of two or more keywords.

A word image synthesizer 40 receives, as input, a keyword Kw from the user input device 12 and, based on the keyword, generates a plurality of keyword images 14 using the different typographic fonts. The same synthesizer 40 can be used for synthesizing synthesized training word images in various fonts for a set of training words to be used in generating the font weights.

A features extractor 42 extracts features from the synthesized keyword and training word images 14 and generates a descriptor for each synthesized word image, based thereon. In the exemplary embodiment, the features are extracted from patches generated by a sliding window, which is translated stepwise across the synthesized word image 14, e.g., in the manner described in any one of U.S. Pub Nos. 2009/0060396; 2009/0060335; 2009/0180695; 2010/0008581; and 2010/0067793.

The same features extractor 42 can be used for extracting features from handwritten word images 22 in the collection that are to be used as training handwritten word images and candidate word images. Alternatively, the documents in the collection 35 may be preprocessed by a separate system (not shown) and the extracted features/descriptors of the extracted word images 22 may be stored in data memory 32.

A statistical model 16 is learned on the descriptors extracted from the synthesized keyword images 14 for a given keyword Kw and the set of computed font weights $\omega_i$. The descriptors and font weights may be stored in memory 32. The same font weights $\omega_i$ can be subsequently used for another keyword.

A scoring component 46 scores candidate handwritten word images 22 in the collection, based on the trained model 16. A tagging component 48 tags high-scoring candidate handwritten word images and/or those documents 18 containing the high-scoring handwritten word images that are determined to be a match for the keyword, e.g., with XML tags, which may also identify the locations of the matching word images 22 in the document (FIG. 4). The tagged documents 20 may be then output by the system 10. In one embodiment, the tagged documents 20 are output to a display 50, associated with the user's device, which displays the tagged documents, or relevant portions thereof. The illustrated display 50 can be a liquid crystal display (LCD), a plasma display, a cathode ray tube (CRT) display, a projection display, or the like. The document image may be highlighted, as shown in FIG. 4, or otherwise modified to indicate a possible match for the keyword identified by the system 10, e.g., for verification by the user using the user input device 12.

Alternatively, the tagged documents 20 may be automatically output for further processing, such as OCR recognition, label-based classification, or the like.

Each of the processing components 36, 38, 40, 42, 46, 48 of system 10 may be in the form of hardware or combination of hardware and software. In the exemplary embodiment, the processing components 36, 38, 40, 42, 46, 48 are in the form of software instructions, stored in main memory 26 of the computing device 24, for performing the exemplary method described with reference to FIG. 1. Components 36, 38, 40, 42, 46, 48 may all be resident in computing device 24 or may be otherwise accessible thereto. While the system 10 is shown as having six processing components 36, 38, 40, 42, 46, 48, it is to be appreciated that two or more components may be combined or a component divided into two or more components.

The computing device 24 may include one or more input/output (I/O) device(s) 62 for communicating with the keyboard 12 and display 50, as well as with document source 30, either directly, as shown, or via one or more computer networks. In one embodiment, the display 50 and keyboard 12 may form part of a user's computing device (not shown) which is linked to the host computer 24 via a wired or wireless link, such as a LAN or WLAN, e.g., the Internet. In other embodiments, the system 10 may be resident on the user's computing device. Document source 30 may be similarly linked.

The various components 26, 28, 32, 62 of the computer 24 may be all connected by a data control bus 68.

The system 10 may be hosted by any suitable computing device or devices 24 that is capable of processing data, such as a general purpose computer, e.g., a desktop or laptop computer or a PDA or the like or a dedicated computing device, such as a web-based server, network server, or the like.

The digital processor 28 can be variously embodied, such as by a single-core processor, a dual-core processor (or more generally by a multiple-core processor), a digital processor and cooperating math coprocessor, a digital controller, or the like. The digital processor 28, in addition to controlling the operation of the computer 24, executes instructions stored in memory 26 for performing the method outlined in FIGS. 1, 3, and 4. The processor 28 may be a central processing unit, or separate processors for each component, in communication with the memory 26, which executes the software instructions for generating font weights and model 16 and performing analysis and markup of the document(s) 18. In other embodiments, the font weights may be generated by a separate computing device and stored in memory 32.

The non-transitory memories 26, 32, can include random access memory (RAM), read-only memory (ROM), a hard disk, optical disk, or so forth and may be all physically located in the computing device 24 or parts thereof may be accessible to the computing device, e.g., via a local area network or the Internet. Data memory 32 may be a part of the main memory 26 or separate therefrom. The data memory 32 may store data, including a document 18, extracted word images 22, synthesized word images 14, optionally, the trained model 16, font weights, and the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further details of the exemplary system and method will now be described.

Selection of Fonts for Synthesis of Training Word Images and Keyword Images (S102)

A large variety of fonts may be included in the set 34 of fonts, without particular attention being given to their selection, since fonts which are less representative of handwritten text are automatically assigned lower weights in the exemplary method. Thus, for example, the set of fonts may include fonts which look "computer-like" (such as Times New Roman, Arial, Courier) as well as "handwritten-like" fonts (such as Kunstler Script, French Script, Lucida Handwriting). In addition to selecting from the fonts conventionally provided in computer implemented word processing software packages, fonts can be obtained from other sources, such as websites. The website www.dafont.com, for example, offers a choice of more than 10,000 fonts organized in a set of super-categories and sub-categories. The sub-category "handwritten" contains close to 500 fonts. The exemplary method could take, as input, a large number or all of these approximately 500 fonts and/or additional fonts, without appreciably impacting computer processing time.

The same set of fonts is used for generating the synthesized training word images for generation of font weights and for generating the keyword images.

Learning the Font Weights (S104)

As noted above, the exemplary system and method do not select fonts in a binary fashion (i.e., yes or no). Rather a continuous weight w, is assigned to each typographic font. By continuous weight it is meant that the weight can vary over a range of values. In one embodiment, the weights are normalized such that all of the font weights sum to a selected value, e.g., 1, i.e., each weight is a positive value less than 1 and at least some (or all) of the weights are greater than 0. However other weighting schemes are also contemplated. A goal of the learning phase (S104) is thus to learn a set of weights such that the weighted distribution of feature-based descriptors of synthesized training word images matches (as closely as possible) the distribution of those of a set of handwritten training word images. The generation of weights $\omega_i$ can be performed prior to the input of any selected keyword(s) since it is independent of the keywords selected.

The learning of font weights can be repeated if the style of handwriting used in the handwritten documents to be queried changes.

S104 of the method may proceed as illustrated in FIG. 3. At S202, handwritten training word images 22 are extracted from the corpus 35 of handwritten documents. In the exemplary embodiment, the corpus of documents 35 used in training is selected to be representative of the type of documents to be queried with keywords later. For example, if the documents to be queried are letters received by a particular company, the training documents may also be letters, or portions thereof, to the same company. In this way, it may be expected that there may be some overlap in the words used, although this is not a requirement. In some embodiments, the training word images are taken from the same pool of documents to be subsequently queried with a keyword. To provide a representative sample of writing styles and words used, there may be, for example, at least 50 or at least 100 documents drawn at random from the corpus 35, and for each document, all or at least a portion of the word images are extracted, to provide, for example, a training set of at least 1000 or at least 10,000 handwritten training word images 22. However, the method may be performed on a smaller number of handwritten training word images, such as from a corpus of documents written by the same person, a single one or few document(s) which is/are to be queried, or even a paragraph of a document to be queried.

At S204, a descriptor (or set of descriptors) of each extracted handwritten training word image 22 is generated, based on low-level features extracted from the word image, as described in further detail below. In the exemplary embodiment, each descriptor is derived from a set of histogram of oriented gradients (HOG) vectors (e.g., each HOG vector may be a 128-dimensional vector). For each word, a set of these vectors is extracted, in sequence. The words image descriptor can comprise a concatenation of these vectors or the concatenation may be reduced in dimensionality. In other embodiments, each vector may be treated as a separate descriptor for the training word image 22.

At S206, for each typographic font in the set 34 of typographic fonts, a set of synthesized training word images 14 is synthesized. In the exemplary embodiment, the actual words corresponding to the handwritten training word images 22 from which the descriptors have been extracted at S204 are not known. Thus, for the synthesized training word images 14, common words in the appropriate natural language (i.e., the one which is expected to be most prevalent in the document collection 35) are selected. For example, if the natural language is English, a few hundred of the most common words in English are selected and synthesized training word images 14 are synthesized for each of these in each of the typographic fonts. In one embodiment, the most common words may be identified from a corpus of typed documents of the same type as the corpus of handwritten documents. For example, if the corpus of handwritten documents includes letters to a corporation, then a set of typed letters to the same corporation may be OCR processed and a histogram of word frequencies generated for the typed document corpus. From this histogram, the most frequent words may be identified. As will be appreciated, the most frequently used words can alternatively be determined from a more general document corpus, such as web pages, books, and the like, and examples of such lists, which may be used herein, are widely available on the web.

At S208, for each font and for each synthesized training word image 14, a descriptor (or set of descriptors), such as a HOG vector is extracted in essentially the same manner as for the handwritten word images 22.

Steps S202-S208 may be preprocessing steps which are performed elsewhere and the handwritten training word images 22 (and/or descriptors extracted therefrom) extracted from the documents may be stored in memory, such as memory 32. The synthesized training word images 14 and/or their descriptors may also be stored in memory 32. Further details on the extraction of word images and generation of feature-based descriptors from extracted handwritten word images and from synthesized word images are given below.

The font weight learning performed by font weight generator 38 can be split into two sub-steps: S210, learning the handwritten and font distributions and S212, matching the statistics of these distributions to identify font weights. S210 may include two substeps: S210A, training a first probabilistic model (e.g., a Gaussian Mixture Model) on the descriptors extracted from the handwritten training word images and S210B, for each font training a probabilistic model (e.g., a Gaussian Mixture Model) based on the descriptors extracted from the synthesized training word images.

Learning the Handwritten and Font Distributions (S210)

Let F represent the number of fonts in the set 34 of fonts.

Let q represent a (first) probability distribution for the handwritten word descriptors (e.g., HOG vectors) and let $p_i$ be a probability distribution of the descriptors extracted for typographic font i, where i represents the index of the font ($1 \leq i \leq F$). In one embodiment, q and the $p_i$'s are represented by respective Gaussian mixture models (GMMs), although other probabilistic models are also contemplated. Each Gaussian mixture model is based on the same pool of N Gaussians (Gaussian functions), where N can be, for example, from about 50 to 1000, e.g., about 500. The GMMs may be trained as follows:

At S210A, a first probability distribution (GMM) q with N Gaussians is trained on the large set of HOG descriptors extracted from the handwritten training word images extracted from the target corpus 35 at S204.

Let $$q = \sum_{n=1}^{N} \pi_i q_i,$$

where the $\pi_i$'s are the mixture weights and the $q_i$'s are the Gaussians.

To estimate q, a Maximum Likelihood Estimation (MLE) criterion may be used. Further details on maximum likelihood estimation as applied to Gaussian mixture models are to be found in J. Bilmes, "A gentle tutorial of the EM algorithm and its application to parameter estimation for Gaussian mixture and hidden Markov models," UC Berkeley, TR-97-021, 1998.

At S210B, for each typographic font in the set 34, one GMM $p_i$ is trained, for example, through MLE or through Maximum a Posteriori (MAP) adaptation of the handwritten GMM q using the HOG descriptors of the synthesized training word images considered font. In the MAP case, each of the font GMMs has, by construction, N Gaussians.

Let $$p_i = \sum_{n=1}^{N} \pi_{i,n} p_{i,n}$$

where the $\pi_{i,n}$'s are the mixture weights and the $p_{i,n}$'s are the Gaussians. Further details on maximum a posteriori estimation as applied to Gaussian mixture models are to be found in "Maximum a Posteriori Estimation for Multivariate Gaussian Mixture Observations of Markov Chains", by J.-L. Gauvain and C. H. Lee., *IEEE Trans. on Speech and Audio Processing*, 2(2):291-298, April 1994.

While in the exemplary embodiment, learning of the font GMMs $p_i$ is performed through adaptation of the handwritten GMM q, that this is not essential. However, an advantage of this method is that it enables the training of the font weights to be performed quickly.

Matching the Distributions of Handwritten Word Descriptors and Synthesized Word Descriptors to Generate Font Weights (S212)

This step aims at identifying an optimal set of font weights by finding a weighted mixture of the GMM's $p_i$ for the fonts i=1 to F which most closely resembles the GMM for the handwritten GMM q.

The optimal set of font weights $\omega_i = \{_1, \ldots, \omega_F\}$ can be obtained by maximizing the similarity (or minimizing the distance/divergence, which for purposes disclosed herein, are considered to be the same) between q and a mixture model:

$$\sum_{i=1}^{F} \omega_i p_i$$

(i.e., a mixture of GMMs). For example, the Kullback-Leibler divergence can be used to measure the proximity of two distributions. This may be performed by maximizing the expectation $E(\omega)$ over all the font weights $\omega_i$:

$$E(\omega) = \int_x q(x) \log \left( \sum_{i=1}^{F} \omega_i p_i(x) \right) dx \qquad \text{Eqn. (1)}$$

where x denotes a random variable which takes its value in the space of the descriptor features.

This may be performed under the constraint:

$$\sum_{i=1}^{F} \omega_i = 1,$$

such that all the mixture weights sum to 1 (or some other normalized number).

As the direct maximization of $E(\omega)$ can be difficult, a sampling approach may be followed. Let $X=\{x_t, t=1 \ldots T\}$ be a set of descriptors extracted from the large number of handwritten training word images in the training image corpus. Assume that the $X_t$'s have been generated independently from q, then according to the law of large numbers (convergence of the descriptor average to the expected value when T increases), this gives:

$$E(\omega) \approx E(\omega, X) = \frac{1}{T} \sum_{t=1}^{T} \log\left( \sum_{i=1}^{F} \omega_i p_i(x_t) \right) \quad \text{Eqn. (2)}$$

Eqn. 2 is thus a measure the likelihood that the descriptors in the handwritten training word corpus were generated by the mixture model. The objective is to find the values of $\omega_i$ which maximize this function. $E(\omega, X)$ is a convex function in $\omega$ and it may be iteratively maximized with a standard expectation-maximization (EM) algorithm as follows:

E-step:

The probability $\gamma_t$ (i), given current estimates for the weights $\omega$, that descriptor $x_t$ of a handwritten word image was generated by font i, (which sums to 1 over all i) is computed:

$$\gamma_t(i) = \frac{\omega_i p_i(x_t)}{\sum_{j=1}^{F} \omega_j p_j(x_t)} \quad \text{Eqn. (3)}$$

M-step:

$$\omega_i = \frac{1}{T} \sum_{t=1}^{T} \gamma_t(i) \quad \text{Eqn. (4)}$$

Convergence to a suitable solution can typically be achieved in a relatively small number of iterations, e.g., performing Eqns. 3 and 4 as few as 1 or 2 times.

While the exemplary optimization is based on EM, other convex optimization techniques, such as gradient-descent-based ones, may alternatively be used.

The exemplary E-step of Eqn. 3 gives soft assignments to the weights. Alternatively, an expectation step which gives a hard assignment can be used, which essentially assigns to each font a 0 or 1 probability that a sample descriptor $x_t$ was created with that font. For example, for each handwritten word image descriptor $x_t$, the descriptor is scored on each of the font GMMS $p_i$. The font i, with the highest score on its GMM $p_i$, is identified and the descriptor is assigned to that font. A histogram of counts can then be generated in which the number of handwritten word image descriptors assigned to each font is recorded. The histogram counts can then be normalized so that the counts sum to 1. The normalized count values can be output as the font weights $\omega_i$.

Once the weights $\omega_i$ are determined, these can be used in S110 for training a keyword model. In some embodiments, the weights may be adjusted rather than being input directly to S110. For example, if it is determined that some of the fonts have very low weights, e.g., less than 10% of the average font weight or fonts with a weight of less than a threshold value, such as 0.01, then the low weighted fonts may be removed from the pool of fonts (which is equivalent to assigning a weight of 0) and the weights of the remaining fonts may be adjusted proportionately to sum to 1. In other embodiments, only the weights of the top weighted fonts are retained, such as the top 100 fonts. For example, if font weights as shown in FIG. 5 were generated (where only a few fonts are shown by way of example), then the font weight for the font Courier New may be set at 0 or the Courier New font removed from the pool of fonts and the remaining font weights adjusted proportionately to sum to 1.

Optional Methods for Reducing the Computational Requirements for Eqns. 3 and 4

Note that computing T×F×N likelihood values $p_{i,n}(x_t)$ can be computationally expensive for a large number T of descriptors (e.g., T=1,000,000), a large number F of fonts (e.g., F=100) and a large number N of Gaussians (e.g., N=512). To speed-up the computation, a procedure inspired by the speech recognition literature can be used (see D. Reynolds, T. Quatieri, and R. Dunn. "Speaker verification using adapted Gaussian mixture models". *Digital Signal Processing,* 10:19, 41, (2000)). This technique is based on two observations:

1. When a GMM q with a large number of Gaussians N is evaluated on a descriptor $x_t$, only a few of the Gaussians will contribute significantly to the likelihood value.

2. The Gaussians of an adapted GMM retain a correspondence with the mixture of Gaussians in the GMM from which they were adapted. Therefore, if $q_n(x_t)$ is high, the $p_{i,n}(x_t)$ values should be high. Hence, a fast scoring algorithm may be employed, as follows, for a given $x_t$:

1. Compute $q_n(x_t)$ for $n=1 \ldots N$ (N Gaussian computations). Then retain the M Gaussians with the highest likelihood (M may be for example, from 1 to 10, e.g., at least 2, e.g., M=5). Let $I_t$ be the set of indices of these Gaussians.

2. For each font i, compute $$p_i(x_t) \approx \sum_{n \in I_t} \pi_{i,n} p_{i,n}(x_t)$$

(F×M Gaussian computations).

Hence, the total number of Gaussian computations is reduced from T×F×N to T×(N+F×M). For F=100 and M=5, this leads to a reduction in computations by a factor of approximately 50.

Using the Font Weights to Learn Keyword Models (S108, S110)

This involves training a model 16 for a specific keyword kw to be searched in a corpus of handwritten word images using the font weights learned at S104. First, at S108, a set of F synthesized word images (one per font) is generated for keyword kw (as for S206). Then, a descriptor (e.g., HOG sequence) is extracted for each synthesized word image (as for S208).

Various types of models 16 can be trained on descriptors of the extracted features of the keyword images, such as hidden Markov models (HMMs), support vector machines, neural networks, or the like. In the exemplary embodiment, a semi-continuous hidden Markov model (SC-HMM) is used. Its particularity is that some parameters of the model (such as means and covariance matrices) are constrained to a universal background model (UBM) that is a way of modeling the vocabulary of the handwritten data. In the present case the UBM can be the already-generated Gaussian mixture model q, built for the handwritten training word descriptors. The universal background model (UBM) may thus comprise, for example, about 512 Gaussians trained using a large number (e.g., 1,000,000) of HOG vectors for handwritten training words randomly extracted from a set of documents. The SC-HMM is trained on top of this UBM and may use about 10 states per character of the keyword.

In an SC-HMM, the same pool of Gaussians (Gaussian functions) that is used for the UBM is also shared by all the states of all training samples. In the HMM, each training descriptor is represented by probabilities for a set of states (or patterns), each state being modeled by Gaussians from the pool (each with a mean vector and covariance matrix). The probability of emitting a descriptor $X_u$ in a given state depends on mixture weights $\lambda_{kw}$ of the SC-HMM, which are the only word- and state-specific parameters. Thus even when trained with synthesized word images, the optimal parameters of the model have to "match" the handwritten vocabulary. This allows a better capability of linking typed and handwritten text.

Let $\{X_u, u=1 \ldots F\}$ be the set of descriptors (e.g., HOG vectors) extracted from the synthesized keyword images for each of the fonts F. The keyword model $p_{kw}$ can be a SC-HMM with parameter $\lambda_{kw}$. The SC-HMM may be trained on the descriptors, as described in U.S. Pub. No. 2010/0067793. To learn the parameters $\lambda_{kw}$, a weighted maximum likelihood estimation (MLE) criterion may be used. This can be achieved by maximizing, over $\lambda_{kw}$:

$$\sum_{u=1}^{F} \omega_u \log p(X_u | \lambda_{kw})$$ Eqn. 5 where $\omega_u$ is the weight for the font indexed by u (which can be the same as $\omega_i$ above or a processed subset thereof, as explained above) and are thus keyword independent. The exemplary embodiment can thus be achieved without requiring any manual labeling of handwritten word images.

Computational Cost

The Gaussians of the handwritten GMM q are the same as those used in the pool of Gaussians of the exemplary SC-HMM. Hence, the algorithm does not require any extra work.

The synthesizing of word images (S206), the feature extraction (S208) and the GMM MAP training (S212) may take as a whole on the order of 15 s per font. Finally, learning the font weights for F=100 may take a few minutes.

Extracting Word Images (S202)

Techniques for extracting word images 22 are described, for example, in above-mentioned U.S. Pub Nos. 2009/0060396; 2009/0060335; 2009/0180695; 2010/0008581; and 2010/0067793. Briefly, a segmentation algorithm extracts sub-images that potentially represent words, employing state-of-the-art techniques based on projection profiles and clustering of gap distances.

Figure 6:
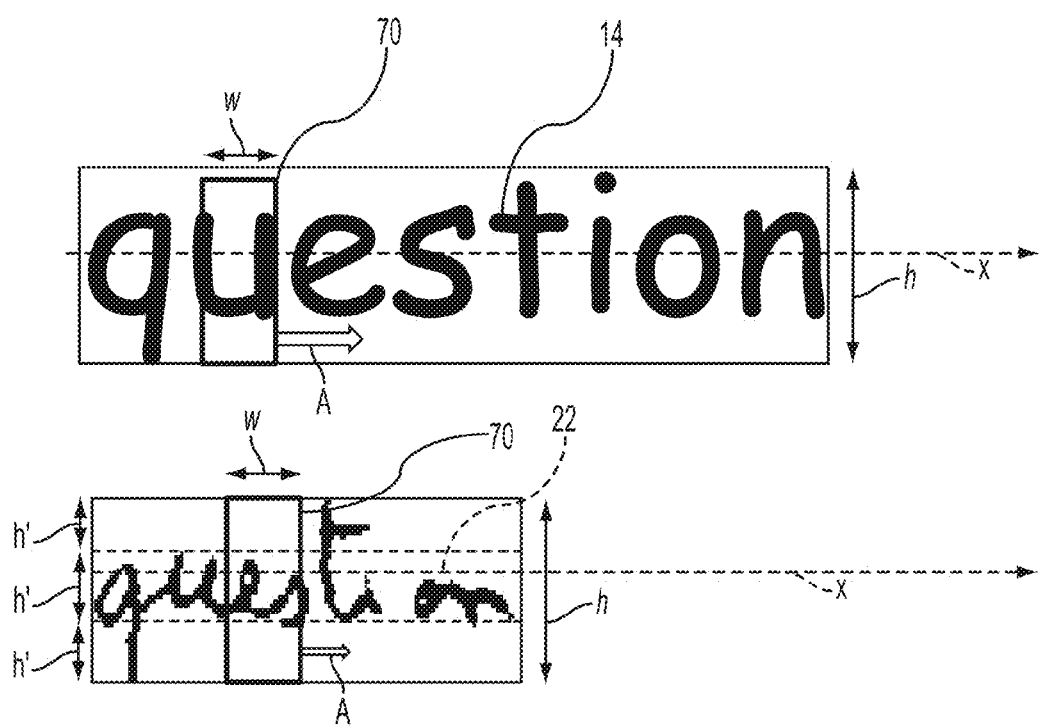
FIG. 6 illustrates extraction of features from synthesized and handwritten word images.

As illustrated in FIG. 6, the extracted word images 22 are normalized with respect to slant, skew and text height. The extracted word images are generally normalized to a fixed height h. This may include normalization of ascender, main body, and descender regions of the word image to a respective height h' corresponding to a fixed number of pixels, such as 18 pixels each, so that a word image having both ascender and descender regions will have a height of 54 pixels. Since the main body height is approximately proportional to the width of an individual character in the character string, normalization helps to generate word images with a length which is approximately proportional to the number of characters in the string.

The synthesized word images 14 in the various fonts are similarly normalized to a fixed height h.

Extraction of Word Image Descriptors (S108, S204, S208)

In generating a descriptor such as an HOG, low level features are first extracted from patches of the word image. The same extraction process can be used for word images 22 in the training set, word images 22 from the documents to be queried, and the synthesized training and keyword images 14. As illustrated in FIG. 6, the patches are generated by translating a sliding window 70 of fixed height h and width w across the normalized image in a single dimension x in the direction of arrow A, generally corresponding to the direction in which the word was written/synthesized. The window 70 is displaced horizontally in steps of a regular interval, such as one or a few pixels, or of a variable interval, so that multiple patches are extracted from each word image 14, 22.

One advantage of this sliding window approach is that it preserves the left-to-right nature of the writing. As will be appreciated, for scripts which use a vertical rather than a horizontal alignment of characters, such as Chinese, the displacement can be in the vertical rather than the horizontal direction., i.e., along the same axis as the stepwise translation.

For each patch, one or more features (local appearance descriptors) are extracted. The features can be extracted for the window image as a whole or portions thereof. Various methods for extracting features are described for example, in U.S. Application Serial Nos. U.S. Pub Nos. 2009/0060396; 2009/0060335; 2009/0180695; 2010/0008581; and 2010/0067793.

For example, features may be obtained for key points, cells, gradient orientations of pixels, or the like, which may then be concatenated to form a features vector, or histogram, which represents the window image (patch) as a whole. The dimensionality of the vector can be reduced, for example, using principal component analysis (PCA).

Scoring Candidate Word Images (S112)

As noted above, to query a document or collection of documents, a set of word images 22 are extracted from the document(s) with the segmenter 36, and for each extracted word image, a set of descriptors may be generated by extractor 42. To score a word image 22 against a keyword Kw, the descriptors of the word image are scored against the respective keyword model 16. For example, a ratio (or other function) of the likelihood of the descriptor coming from the keyword model 16 vs. the likelihood of it coming from a background model, such as q, is computed.

The score of a sample 22 may be obtained by a likelihood ratio, as described, for example, in U.S. Pub. Nos. 2009/0180695 and 2010/0067793, in a process called score normalization. In this sense, SC-HMMs are attractive models because the same background UBM can be used for score normalization, thus coming at little extra computational cost. Using a GMM background model works very well in practice because it models both the distribution of word image patterns and of writing styles. Thus, if the keyword contains very frequent patterns (e.g., if it contains frequent letters), then many candidate word images are likely to score high on an ordinary HMM. However, as the GMM models the distributions of patterns found in any word image, then a word image containing frequent patterns will also score high on the GMM background model, which is factored into the SC-HMM.

Identification of Matching Word Images (S114)

The results obtained at S112 can be presented in a variety of ways. In one embodiment, the word images 22 can be ranked according to their scores, with the top K being considered to be matches for the keyword. The value of K may be selected to be appropriate for the size of the collection of samples 22. In a large collection, K may be correspondingly large, e.g., about 25, whereas for a collection extracted from a single document, K may be as low as 1. In another embodiment, the word images with scores greater than a fixed threshold value are considered matches. In yet another embodiment, at least the most highly ranked word image is considered a match. The matching word image(s) may be output, e.g., to a display, to be displayed to a user, or output to a memory storage device in the computer or external thereto. Alternatively or additionally, matching word images, and/or the documents containing them, may be labeled for further processing.

In another embodiment, fewer than all of the handwritten word images in the collection are scored. For example, if the user wishes to identify a document written by a certain person and inputs the name of the person as the keyword, when the system identifies a candidate word image which meets a threshold score to be considered a match, processing of further word images may be halted. For example, the document or portion thereof containing the name may be presented to the user for verification. If it is not deemed to be a correct match, processing of further word image samples 22 may continue.

In another embodiment, a document may be labeled according to whether it has a threshold likelihood that it includes one or more keywords from an input set of keywords.

The methods illustrated in FIGS. 1, 3, and 4 may be implemented in a non-transitory computer program product or products that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1 or 3, can be used to implement the exemplary methods described herein.

The exemplary system 10 has been demonstrated to provide good performance even though the keyword model is not trained on a set of handwritten examples of the query word Kw, but only on a set of typed text examples. While the performance may not match that which can be achieved when using actual handwritten samples of the keyword, a significant advantage is that typed text images for a given keyword can be rendered automatically and in a variety of fonts. This allows a training set to be obtained in a completely automated manner and in a relatively short time. The word spotting system thus allows any word to be searched in a handwritten document collection without providing a single training example.

Another advantage is that it allows querying for any word. Since handwritten examples of the query word need not be provided, the system 10 is not limited to the words for which a representative number of examples can be collected. In the exemplary system, keyword models do not need to be trained beforehand (other than for the universal background part of the model) because they can be trained on the fly, thus resulting in an easier interface.

The weighted set of fonts may be used in a method for training a categorizer for assigning handwritten documents to one of a set of predetermined classes based on identification of certain keywords in the documents. A method for categorizing handwritten documents with such a categorizer into categories, based on frequencies of identified keywords, and to a computer program product which includes instructions for performing the exemplary methods may also be provided. Aspects of the exemplary embodiment also relate to an apparatus for training a categorizer and to a categorization system employing the trained categorizer which may be used in a method for categorizing handwritten documents, based on spotting handwritten keywords in document images. The exemplary categorizer training method may rely on a collection of both handwritten and typed training documents which are each manually labeled with a label corresponding to a respective one of a finite set of categories.

Specific applications of the exemplary system and method include:

1. Finding infrequent keywords, such as specific person names or address names.

2. Finding handwritten examples in a text corpus which can then be used as a training set for a wordspotting system. This can lead to an improved wordspotting system without the costs usually employed in collection of actual handwritten samples as these are costly to collect. The exemplary method can thus serve as a preliminary step for finding a training set in a semi-automatic way. The retrieved handwritten samples can be manually checked and the correctly retrieved samples can be used to train a better model for spotting the corresponding word.

3. Querying documents in multiple languages. This may be achieved by first translating the keyword Kw into a number of languages, generating word images 14 for each translated word, and performing searches in a collection of multilingual documents. This embodiment would be particularly useful for organizations working in countries with multiple official languages (Switzerland, Belgium, India, etc.) or international institutions (such as the EU parliament).

4. In the context of the digital mailroom, for example, the method may be used for automatic document routing to a specific department and/or automatic document prioritization.

5. Opinion mining: e.g., for counting the number of incoming letters dealing with "global warming".

Without intending to limit the scope of the exemplary embodiment, the following example demonstrates one application of the system and method.

EXAMPLE

A) Experimental Setup

A database consisting of a set of 600 scanned letters written in French to a French company was used for evaluation of the method. The database included considerable variability in writing styles, artifacts and other anomalies such as spelling mistakes. The occurrences of a set of ten keywords in the database were labeled for evaluation purposes. All the keywords were known to be common words in the dataset (including Monsieur, Madame, contrat, résiliation, résilier, salutation, demande, abonnement, and veuillez).

The performance of the detection task was evaluated in terms of the average precision (AP) measure, common in information retrieval. AP indicates the average precision of a recall-precision plot. In the following examples, synthesized training examples 14 were generated for each of the keywords in each of a set of fonts and a mean average precision determined for the ten keywords.

A segmentation process was carried out on the scanned letters to obtain a set of handwritten word images 22. There are approximately 300 such word images per page. From each word image, a sequence of 128-dimensional HOG features was extracted as described above to generate a descriptor (HOG vector).

The GMM q modeling the distribution of handwritten training word descriptors has N=512 Gaussians. This GMM was trained on a set of approximately 100 of the handwritten pages. These 100 pages were not used for evaluation purposes. Only the remaining 500 pages were used for this purpose.

A set of 100 fonts was created. Nine of these fonts are the same ones which were selected by the heuristic of U.S. Pub. No. 2010/0067793. The 91 other fonts come from the "handwritten" subcategory of www.dafont.com. For each font, word images for the 2,000 most common words in English were generated. A sequence of HOG features was extracted for each synthesized word image and MAP adaptation was used to learn the font GMMs $p_i$.

All the keyword SC-HMMs were trained on top of the handwritten GMM q and used 10 states per character.

In a first experiment, only the 9 fonts which were selected by the heuristic of U.S. Pub. No. 2010/0067793 were used. Hence, the exemplary algorithm should learn how to best weigh these 9 fonts. The results are shown in Table 1.

TABLE 1

Comparison of the heuristic of U.S. Pub. No. 2010/0067793 (Prior) with the Exemplary method (restricted to 9 fonts)

| Keyword | Prior method Average Precision (in %) | Exemplary method Average Precision (in %) |
|---|---|---|
| Monsieur | 40.1 | 40.3 |
| Madame | 55.8 | 55.8 |
| contrat | 39.5 | 37.4 |
| résiliation | 45.4 | 44.6 |
| salutation | 27.4 | 27.0 |
| résilier | 21.1 | 21.1 |
| demande | 56.0 | 55.7 |
| abonnement | 79.5 | 79.4 |
| veuillez | 41.1 | 40.1 |
| ... | ... | ... |
| Mean Average Precision | 48.5 | 47.9 |

It can be seen that the exemplary method is on par with that of U.S. Pub. No. 2010/0067793. This is a significant achievement because in the prior application, the nine fonts were selected to maximize the test accuracy for the keywords on this dataset while the weights computed by the present method are keyword-independent. This gives an undue advantage to the approach of Pub. No. 2010/0067793, but as previously noted, the present exemplary method is much less computationally intensive.

In a second experiment, the full set of 100 fonts and their weights, computed as described above using Eqns. 3 and 4, were considered. Selecting the best combination of fonts with the heuristic of U.S. Pub. No. 2010/0067793 would take several days of CPU time and would therefore be impractical. This is to be contrasted with the present method, which can be efficiently trained in a matter of minutes. The results for the present method are shown in Table 2. It can be seen that the efficiency of the exemplary method enables the system to handle a much larger number of fonts. The average increase in average precision, going from 9 fonts to 100 fonts is +8.5%, which is a significant achievement.

TABLE 2

Retrieval results with 100 fonts

| Keyword | Average precision for exemplary method (in %) |
|---|---|
| Monsieur | 51.8 |
| Madame | 59.1 |
| contrat | 68.0 |
| résiliation | 50.9 |
| salutation | 27.2 |
| résilier | 26.4 |
| demande | 61.7 |
| abonnement | 83.0 |
| veuillez | 51.6 |
| ... | ... |
| Mean Average Precision | 56.4 |

As can be seen, the exemplary method provides good average precision.

Finally, as a comparison, the accuracy (mean average precision) of a query-by-example (QBE) system (using a single handwritten sample rather than synthesized training samples) on this dataset is 32.3%, which is far below the 56.4% obtained with the exemplary system using 100 synthesized fonts. This shows that the present method is advantageous with respect to a QBE approach.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   receiving a keyword;
   for each font of a set of typographical fonts, synthesizing a word image based on the keyword;
   training a keyword model based on the synthesized word images and a respective font weight for each font of the set of typographical fonts, the font weights being learned by maximizing a similarity between a weighted distribution of descriptors of synthesized training word images and a distribution of descriptors of handwritten training word images, each synthesized training word image descriptor being based on features extracted from a respective synthesized word image, each handwritten training word image descriptor being based on features extracted from a respective handwritten training word image;
using the trained keyword model, identifying at least one handwritten word image of a collection of handwritten word images which matches the keyword; and
at least one of the synthesizing, training, and identifying being performed with a computer processor.

2. The method of claim 1, further comprising:
outputting at least one of the identified matching handwritten word images.

3. The method of claim 1, wherein the training of the keyword model is based on descriptors extracted from the synthesized word images and the font weights.

4. The method of claim 1, wherein the font weights are generated prior to the receiving of the keyword.

5. The method of claim 1, wherein the keyword model comprises a semi-continuous hidden Markov model.

6. The method of claim 1, wherein the learning of the keyword model comprises learning parameters of the keyword model with a weighted Maximum Likelihood Estimation (MLE) criterion.

7. A non-transitory computer program product encoding instructions, which, when executed on a computer, causes the computer to perform the method of claim 1.

8. A computer implemented processing system comprising non-transitory memory storing instructions for performing the method of claim 1 and a processor in communication with the memory for executing the instructions.

9. The method of claim 1, further comprising:
extracting the collection of handwritten word images from at least one document.

10. The method of claim 9, wherein the extracting comprises scanning at least one handwritten document and segmenting the scanned handwritten document.

11. The method of claim 1, wherein the synthesizing of the word image based on the keyword comprises generating a binary image of a fixed pixel height in pixels and wherein the handwritten word images in the collection are normalized to the same fixed pixel height and are binary images.

12. The method of claim 11, wherein the training of the keyword model comprises training the keyword model with descriptors extracted from the synthesized word images, the descriptors being based on features which are extracted from patches of the synthesized word image by translating the image stepwise with a window of fixed height and width and at each step, extracting a patch.

13. The method of claim 1, further comprising:
implementing a computer implemented process for at least one document from which a matching handwritten word image was extracted.

14. The method of claim 13, wherein the computer implemented process comprises at least one of:
displaying at least that portion of the document from which the matching word image was extracted; and
providing for further processing of a document which contains a matching word image.

15. A method comprising:
receiving a keyword;
for each font of a set of typographical fonts, synthesizing a word image based on the keyword;
training a keyword model based on the synthesized word images and a respective font weight for each font of the set of typographical fonts, wherein the font weights are learned using a set of handwritten word image descriptors, each of the handwritten word image descriptors being based on features extracted from a respective handwritten word image drawn from a collection of handwritten word images;
using the trained keyword model, identifying at least one handwritten word image of the collection of handwritten word images which matches the keyword; and
at least one of the synthesizing, training, and identifying being performed with a computer processor.

16. A non-transitory computer program product encoding instructions, which, when executed on a computer, causes the computer to perform the method of claim 15.

17. A method comprising:
learning font weights, including:
training a first probabilistic model on descriptors extracted from a set of handwritten training word images;
for each font of a set of typographical fonts, training a respective font probabilistic model on descriptors extracted from a set of synthesized training word images in the respective font; and
computing a weight for each of the typographical fonts to maximize a similarity between the first probabilistic model and a mixture model of the font probabilistic models;
receiving a keyword;
for each font of the set of typographical fonts, synthesizing a word image based on the keyword;
training a keyword model based on the synthesized word images of the keyword and the respective learned font weight for each font of the set of typographical fonts;
using the trained keyword model, identifying at least one handwritten word image of a collection of handwritten word images which matches the keyword; and
wherein at least one of the learning of font weights, synthesizing, training the keyword model, and identifying is performed with a computer processor.

18. The method of claim 17, wherein the descriptors comprise histograms of oriented gradients extracted from patches of the respective word image.

19. The method of claim 17, wherein the first probabilistic model and the font probabilistic models are Gaussian Mixture Models.

20. The method of claim 17, wherein the computation of the weights is performed under a constraint that all the weights sum to a given value.

21. The method of claim 17, wherein the maximizing of the similarity is based on a Kullbach-Leibler divergence measure.

22. A non-transitory computer program product encoding instructions, which, when executed on a computer, causes the computer to perform the method of claim 17.

23. A method comprising:
learning font weights, including:
for each font of a set of typographical fonts, training a respective font probabilistic model on descriptors extracted from a set of synthesized training word images in the respective font;
scoring handwritten training word image descriptors extracted from handwritten training word images against each of the font probabilistic models and for each handwritten training word image descriptor, assigning the handwritten training word image descriptor to the font probabilistic model for which a respective score is highest; and
generating font weights based on a number of the handwritten training word image descriptors assigned to each of the font probabilistic models;

receiving a keyword;

for each font of a set of typographical fonts, synthesizing a word image based on the keyword;

training a keyword model based on the synthesized word images and the respective learned font weight for each font of the set of typographical fonts;

using the trained keyword model, identifying at least one handwritten word image of a collection of handwritten word images which matches the keyword; and at least one of the learning, synthesizing, training of the keyword model, and identifying being performed with a computer processor.

24. A computer implemented processing system comprising:

a synthesizer which synthesizes a word image in each of a set of typographical fonts based on a received keyword;

a keyword model, stored in memory, which is trained on descriptors extracted from the synthesized word images and a set of generated font weights learned by maximizing a similarity between a weighted distribution of descriptors extracted from synthesized training word images and a distribution of descriptors extracted from handwritten training word images;

a scoring component which scores handwritten word images of a collection of handwritten word images against the keyword model and, based on the scores, identifies any matching handwritten word images; and a computer processor for implementing the font weight generator, synthesizer, and scoring component.

25. The processing system of claim 24, further comprising, at least one of:

a document segmenter which processes at least one input document image to identify the handwritten word images;

a font weight generator for generating a respective weight for each of the set of typographical fonts; and a features extractor which extracts low level features of the synthesized word images and the handwritten word images and generates a respective descriptor based on the extracted features.

26. The processing system of claim 24, wherein the keyword model comprises a semi-continuous hidden Markov model which includes a background model trained on sample handwritten word images prior to receipt of a keyword.

27. The processing system of claim 24, further comprising an output which outputs at least one of the identified handwritten word images and documents from which they were extracted.

28. A computer implemented method for wordspotting comprising:

receiving a keyword to be searched for in a collection of handwritten word images extracted from one or more documents;

for each of a set of fonts, automatically generating a synthesized word image based on the keyword;

modeling the keyword with a semi-continuous hidden Markov model which takes into account weights assigned to each of the fonts, the weights being learned by maximizing a similarity between a weighted distribution of descriptors of synthesized training word images and a distribution of descriptors of handwritten training word images, each descriptor being based on features extracted from a respective synthesized or handwritten training word image;

with the model, identifying matching word images in the collection of handwritten word images; and outputting information based on the identified matching word images.

* * * * *